United States Patent Office 2,760,942
Patented Aug. 28, 1956

2,760,942

HEAT-SEALABLE COATING CONSISTING OF POLYVINYL ALCOHOL, UREA, AND DEXTROSE

Norman Bruce Oakley, Hopewell, Va., assignor to Hercules Powder Company, Wilmington, Del., a corporation of Delaware No Drawing. Application April 11, 1952,
Serial No. 281,888

12 Claims. (Cl. 260—17.4)

This invention relates to the art of packaging materials. In a specific aspect this invention relates to a novel heat-sealing coating composition and to the method of heat-sealing packaging films with said composition. In a more specific aspect this invention relates to novel water-soluble, heat-sealing coating compositions and to the method of heat-sealing water-soluble films of cellulose derivatives with said compositions.

Throughout this specification polyvinyl alcohol (PVA) refers to a group of closely related compounds made by the saponification or hydrolysis of polyvinyl esters, particularly polyvinyl acetate. The resulting products are either water-soluble or water-insoluble depending in part on the extent to which the product is saponified or hydrolyzed. Although effective heat-sealing coating compositions can be prepared with the water-insoluble products, such as a 47% hydrolyzed polyvinyl acetate of high viscosity, it is preferred for this invention that the polyvinyl acetate be sufficiently hydrolyzed to produce a substantially water-soluble polyvinyl alcohol.

In the packaging field, heat-sealing coatings are employed rather extensively in the sealing of the packages or films. Among the requirements for an effective heat-sealing composition are that the composition be compatible with the film or packaging material and that the composition be effective for producing a strong seal. It is an object of this invention to provide novel and effective heat-sealing compositions for use in the packaging art.

Cellulose derivatives, either water-soluble or water-insoluble, are used for the formation of packaging films or pellicles. Among the water-insoluble cellulose derivatives that can be used are cellophane and the like, and among the water-soluble cellulose derivatives that can be used are carboxymethyl hydroxyethyl cellulose, carboxymethyl cellulose, methyl cellulose, hydroxyethyl cellulose, cellulose sulfate, and the like. In my co-pending application, Serial No. 203,529, filed December 29, 1950, now U. S. Patent 2,653,108, a packaging film containing carboxymethyl hydroxyethyl cellulose is described. It is another object of this invention to provide novel heat-sealing compositions for the sealing of packaging films of cellulose derivatives.

Water-soluble cellulose derivatives, such as carboxymethyl hydroxyethyl cellulose, and the like, have been found to be quite effective for the packaging of comestibles and materials, such as detergents, soap powders, and the like. In the packaging of such materials with water-soluble cellulose derivatives as the packaging film or pellicle, it is desirable that the composition that is employed to seal the film or pellicle be water-soluble in order that the entire film can be dissolved in water. It is another object of this invention to provide novel and effective water-soluble heat-sealing coating compositions for sealing films or pellicles of water-soluble cellulose derivatives.

It is another object of this invention to provide novel and effective heat-sealing coating compositions for sealing water-soluble films or pellicles of carboxymethyl hydroxyethyl cellulose.

It is a further object of this invention to provide novel and effective heat-sealing coating compositions for the sealing of water-soluble films or pellicles comprising carboxymethyl hydroxyethyl cellulose, dipropylene glycol, and glycerin.

It is a still further object of this invention to provide a novel method of heat-sealing packaging films or pellicles employing novel coating compositions for said films or pellicles.

Further and additional objects of this invention will be readily apparent from the detailed disclosure that follows.

In accordance with this invention it has been found that compositions containing polyvinyl alcohol in a concentration of at least 50% and at least one of urea and dextrose are effective heat-sealing coating compositions for packaging films or pellicles. In the preferred form of the invention, the heat-sealing composition contains both urea and dextrose in addition to the polyvinyl alcohol. This discovery is particularly astounding in view of the fact that polyvinyl alcohol, although it possesses heat-sealing properties, is poorly compatible with various cellulose derivatives and tends to form laminar coatings when employed in a heat-sealing composition. Urea, on the other hand, has been found to be ineffective as a heat-sealing coating composition.

The following examples are illustrative of this invention. In the coating formulations for each of the runs, the compositions of the coatings are in parts by weight.

*Examples 1-9*

In the following runs, a film containing 65 parts of carboxymethyl hydroxyethyl cellulose, 25 parts of dipropylene glycol and 10 parts of glycerin was coated with the coating formulations indicated below, and the film was then heat-sealed with a hand model "Power Weld" sealer at a surface temperature of 240° F. The polyvinyl alcohol (PVA) was 77% hydrolyzed polyvinyl acetate of medium viscosity. The bond strengths were measured by clamping a weight to pull apart a seal 0.5 inch deep by 1 inch wide, applying the tension at distances 0.5 inch on each side of the seal.

| Run | Coating Formulation | Bond Strength |
|---|---|---|
| 1 | PVA/urea—80/20 | Good but failed after 48 hours' exposure at 50% relative humidity. |
| 2 | PVA/urea—90/10 | Do. |
| 3 | PVA/sucrose—90/10 | Poor. |
| 4 | PVA/sucrose/urea—90/5/5 | Do. |
| 5 | PVA/dextrose/urea—90/5/5 | Good. |
| 6 | PVA/dextrose/urea—90/8/2 | Fair. |
| 7 | PVA/dextrose/urea—90/6/4 | Do. |
| 8 | PVA/dextrose/urea—90/4/6 | Good. |
| 9 | PVA/dextrose/urea—90/2/8 | Fair. |

*Examples 10-27*

Coating formulations of the compositions listed below were employed to heat-seal a film as in Example 1. The bond strength of the film was observed in grams per inch.

| Run | Coating Formulation | Bond Strength in g./in. |
| --- | --- | --- |
| 1 | PVA (100) | 60. |
| 2 | PVA/urea (90/10) | 58. |
| 3 | PVA/urea (80/20) | 45. |
| 4 | PVA/urea (70/30) | 31. |
| 5 | PVA/urea (60/40) | 31. |
| 6 | PVA/urea (50/50) | Slight seal. |
| 7 | Urea (100) | No seal. |
| 8 | PVA/dextrose (90/10) | 60. |
| 9 | PVA/dextrose (80/20) | 45. |
| 10 | PVA/dextrose (50/50) | 35. |
| 11 | PVA/urea/dextrose (90/5/5) | 60. |
| 12 | PVA/urea/dextrose (80/5/15) | 52. |
| 13 | PVA/urea/dextrose (80/15/5) | 54. |
| 14 | PVA/urea/dextrose (70/10/20) | 49. |
| 15 | PVA/urea/dextrose (70/20/10) | 45. |
| 16 | PVA/urea/dextrose (60/15/25) | 38. |
| 17 | PVA/urea/dextrose (60/30/10) | 35. |
| 18 | PVA/urea/dextrose (40/50/10) | No seal. |

*Examples 28–33*

In addition to the water-soluble films containing carboxymethyl hydroxyethyl cellulose described above, a coating containing 90 parts PVA, 5 parts urea and 5 parts dextrose was employed to heat-seal the following water-soluble films:

1. 80 parts carboxymethyl hydroxyethyl cellulose and 20 parts dipropylene glycol;
2. Sodium carboxymethylcellulose (unplasticized) having a .70 degree of substitution;
3. 80 parts sodium carboxymethylcellulose having a .70 degree of substitution and 20 parts glycerin;
4. 80 parts methyl cellulose having a viscosity of 25 cps. and 20 parts glycerin;
5. 80 parts sodium cellulose sulfate of low viscosity and having a .4 degree of substitution and 20 parts glycerin;
6. 80 parts hydroxyethyl cellulose having a 1.4 degree of substitution and 20 parts glycerin.

*Example 34*

The same coating formulation used in Examples 28–33 was also employed to effectively seal a water-insoluble film of cellophane.

The polyvinyl alcohol, urea and dextrose that are employed to form the heat-sealing coatings of this invention are available commercially. Although water-insoluble forms of polyvinyl alcohol can be used in heat-sealing packaging films, it is preferred to employ a polyvinyl alcohol that has been sufficiently hydrolyzed to substantial water solubility in order that the heat-sealing composition wil be water-soluble. Consequently, the composition can be employed effectively with water-soluble films. Although polyvinyl alcohol can be employed alone as a heat-sealing composition, it has disadvantages in that it is incompatible with certain films, such as those containing carboxymethyl hydroxyethyl cellulose, and as a coating it tends toward lamination. Accordingly, improved heat-sealing coatings can be obtained by incorporating urea and/or dextrose in the polyvinyl alcohol. The presence of the urea in the composition improves the adhesion of the coating, and it also lowers the fusion temperature of the polyvinyl alcohol. The data in Examples 10–27 above indicate that in order to obtain a seal with a coating composition containing polyvinyl alcohol, the composition should contain a minimum of 50 parts by weight of polyvinyl alcohol based on 100 parts of coating composition. The remaining portion of the composition is composed of urea and/or dextrose in various proportions. In a preferred form of the invention, the coating composition contains about 90 parts of polyvinyl alcohol per 100 parts of composition. The remaining portion of the composition is urea and/or dextrose. The presence of the urea is desired in order to improve the adhesion of the coating, and effective heat seals have been obtained with a coating composition containing 90 parts of polyvinyl alcohol and 10 parts of urea. However, it was found that when a film heat-sealed with such a composition was exposed to a high humidity or to an average humidity for an extended period of time, the coating composition lost its bond strength. The presence of the dextrose in the coating composition overcomes this defect. Accordingly, the most preferred coating composition of this invention contains 90 parts polyvinyl alcohol, 5 parts urea and 5 parts dextrose. It will be understood by those skilled in the art that numerous other combinations of these three components can be employed provided the composition does not contain less than 50 parts of polyvinyl alcohol per 100 parts of coating composition.

From the above examples, it is apparent that the coating composition of this invention can be employed in the heat-sealing of both water-insoluble and water-soluble films. In the preferred form of the invention, the coating composition is water-soluble, and it is employed in the heat-sealing of films made of water-soluble cellulose derivatives. In the most preferred form of the invention, the coating composition is employed in the heat-sealing of films containing carboxymethyl hydroxyethyl cellulose, such as the films described particularly in Examples 1–9. The carboxymethyl hydroxyethyl cellulose contains a degree of substitution such that the cellulose derivative is water-soluble. The degrees of substitution that were employed in the above examples are 0.43 carboxymethyl and 0.35 hydroxyethyl substituents per anhydroglucose unit. However, it will be understood that other degrees of substitution can be used without departing from the scope of the invention.

The coating composition can be applied to the film to be sealed in any suitable manner. In most instances, the composition will be dissolved in a solvent and then applied to the film. In the above examples, the coating composition was applied in this manner. Any solvent that will impart the necessary viscosity to the solution and that is not a solvent for the film to be sealed can be used. Effective solvents are the lower aliphatic alcohols, such as methanol, ethanol, and the like. In the above examples, a 1:1 ethanol/water solvent was employed. The lower aliphatic alcohols appear to be the most practical solvents for the application of polyvinyl alcohol coating compositions to packaging films. Sufficient solvent is used to obtain a solution containing no more than about 20% solids in order to insure a thin heat-sealing coating. Preferably a solution containing from 5% to 10% solids is used to insure a thin coating of about 0.1 to 0.2 mil in thickness.

The heat-sealing composition can be applied to the film to be sealed in any suitable manner. For example, the solution containing the coating composition can be sprayed, brushed, rolled or otherwise applied to the film. Any satisfactory method of application is within the scope of the invention, and after application the film is heat-sealed at a temperature within the range of 190° F. to 350° F. In the above examples, a temperature of 240° F. was found to be satisfactory.

Packaging films sealed in accordance with this invention can be used to package detergents, foodstuffs, household and industrial dyes, starch, insecticides, weed-killers, water softeners, and the like.

Numerous modifications within the scope of this invention will be apparent to those skilled in the art.

What I claim and desire to protect by Letters Patent is:

1. A water-soluble envelope comprising a packaging film of a water-soluble film forming cellulose derivative and a water-soluble, heat-sealable coating consisting essentially of polyvinyl alcohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

2. A water-soluble envelope comprising a packaging film of water-soluble carboxymethyl hydroxyethyl cellulose and a water-soluble, heat-sealable coating consisting essentially of polyvinyl alcohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

3. A water-soluble envelope comprising a packaging film of water-soluble sodium carboxymethylcellulose and a water-soluble, heat-sealable coating consisting essentially of polyvinyl alcohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

4. A water-soluble envelope comprising a packaging film of water-soluble hydroxyethyl cellulose and a water-soluble, heat-sealable coating consisting essentially of polyvinyl alcohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

5. A water-soluble envelope comprising a packaging film of water-soluble methyl cellulose and a water-soluble, heat-sealable coating consisting essentially of polyvinyl alcohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

6. A water-soluble envelope comprising a packaging film of water-soluble cellulose sulfate and a water-soluble, heat-sealable coating consisting essentially of polyvinyl acohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

7. A water-soluble envelope comprising a packaging film of carboxymethyl hydroxyethyl cellulose containing 0.43 carboxymethyl and 0.35 hydroxyethyl substituents per anhydroglucose unit, dipropylene glycol and glycerin and a heat-sealable coating consisting essentially of polyvinyl alcohol, urea and dextrose, said polyvinyl alcohol being present in said coating in an amount at least equal to 50 parts by weight per 100 parts by weight of coating, said urea and dextrose each being present in said coating in an amount at least equal to 2 parts by weight per 100 parts by weight of coating, the sum of the amounts of said urea and dextrose present in said coating not exceeding 50 parts by weight per 100 parts by weight of coating.

8. An envelope according to claim 7 wherein the coating contains 90 parts polyvinyl alcohol, 5 parts urea and 5 parts dextrose.

9. As a composition of matter, a heat-sealing coating composition consisting essentially of a lower aliphatic alcohol solution containing as solute 90 parts by weight of polyvinyl alcohol, 5 parts by weight urea and 5 parts by weight dextrose, based on the weight of the solute.

10. As a composition of matter, a heat-sealable coating composition consisting essentially of an ethanol solution containing as solute 90 parts by weight of water-soluble polyvinyl alcohol, 5 parts by weight urea and 5 parts by weight dextrose.

11. As a composition of matter, a heat-sealable coating composition consisting essentially of an ethanol solution containing as solute 90 parts by weight of water-soluble polyvinyl alcohol, 5 parts by weight urea and 5 parts by weight dextrose, said solution having a solids content not greater than 20%.

12. As a composition of matter, a heat-sealable coating composition consisting essentially of a lower aliphatic alcohol solution containing as solute at least 50 parts by weight of water-soluble polyvinyl alcohol and not more than 50 parts by weight of urea and dextrose, said urea and dextrose each being present in the composition in an amount at least equal to 2 parts by weight.

References Cited in the file of this patent

UNITED STATES PATENTS

| | | |
|---|---|---|
| 2,162,618 | Izard | June 13, 1939 |
| 2,275,578 | Wood | Mar. 10, 1942 |
| 2,298,522 | Waters | Oct. 13, 1942 |
| 2,340,311 | Donovan | Feb. 1, 1944 |
| 2,340,866 | Dangelmajer | Feb. 8, 1944 |
| 2,349,732 | Howard | May 23, 1944 |
| 2,373,285 | Baer | Apr. 10, 1945 |
| 2,432,575 | King | Dec. 16, 1947 |
| 2,457,357 | Fenn | Dec. 28, 1948 |
| 2,579,481 | Fenn | Dec. 25, 1951 |
| 2,579,483 | Fenn | Dec. 25, 1951 |
| 2,595,276 | Lowry | May 6, 1952 |
| 2,653,108 | Oakley | Sept. 22, 1953 |